US005104743A

United States Patent [19]

Nishikawa et al.

[11] Patent Number: 5,104,743

[45] Date of Patent: Apr. 14, 1992

[54] ALUMINUM SUPPORT FOR LITHOGRAPHIC PRINTING PLATE

[75] Inventors: Yasuhisa Nishikawa, Shizuoka; Hiroshi Ikeda, Inazawa; Kazushige Takizawa; Hirokazu Sakaki, both of Shizuoka, all of Japan

[73] Assignees: Nippon Light Metal Co. Ltd, Tokyo; Fuji Photo Film Co. Ltd, Minamiashigara, both of Japan

[21] Appl. No.: 646,255

[22] Filed: Jan. 28, 1991

[30] Foreign Application Priority Data

Jan. 30, 1990 [JP] Japan .................................... 2-17874

[51] Int. Cl.[5] ........................ B32B 15/04; B41N 1/08

[52] U.S. Cl. .................................. 428/472.2; 101/459

[58] Field of Search ...................... 428/472.2; 420/535, 420/538; 101/459

[56] References Cited

U.S. PATENT DOCUMENTS

| | | | |
|---|---|---|---|
| 3,717,915 | 2/1973 | Teubler | 101/459 |
| 4,686,083 | 8/1987 | Takizawa et al. | 101/459 |
| 4,861,396 | 8/1989 | Matsuo et al. | 101/459 |
| 4,939,044 | 7/1990 | Ohashi et al. | 101/459 |

FOREIGN PATENT DOCUMENTS

| | | | |
|---|---|---|---|
| 97318 | 1/1984 | European Pat. Off. | 101/459 |
| 158941 | 10/1985 | European Pat. Off. | 101/459 |
| 3406406A1 | 10/1984 | Fed. Rep. of Germany | 101/459 |
| 60-5861 | 1/1985 | Japan | 101/459 |
| 61-146598 | 7/1986 | Japan | 101/459 |
| 61-274993 | 12/1986 | Japan | 101/459 |
| 62-140894 | 6/1987 | Japan | 101/459 |
| 62-181190 | 8/1987 | Japan | 101/459 |
| 62-181191 | 8/1987 | Japan | 101/459 |
| 1421710 | 1/1976 | United Kingdom | 101/459 |

*Primary Examiner*—John J. Zimmerman

*Attorney, Agent, or Firm*—William J. Daniel

[57] ABSTRACT

An aluminum alloy substrate for a lithographic printing plate consisting essentially of an aluminum alloy plate containing 0.2 to 0.5% by weight of Si, 0.3 to 0.7% by weight of Fe, 0.004 to 0.02% by weight of Cu, 0.9 to 1.5% by weight of Mn, 0.05 to 0.3% by weight of Mg and 0.01 to 0.04% by weight of Ti and the balance of Al and impurities, in which the surface of said aluminum alloy plate is roughened electrolytically and anodized. The alluminum alloy substrate has high mechanical strength and can also rapidly print a large number of copies with less stain.

3 Claims, No Drawings

ALUMINUM SUPPORT FOR LITHOGRAPHIC PRINTING PLATE

BACKGROUND OF THE INVENTION

1. Field of the Invention

The present invention concerns an aluminum alloy substrate for a lithographic printing plate of high mechanical strength and, more particularly, relates to an aluminum alloy substrate for a lithographic printing plate suitable to surface-roughening treatment and having excellent water retainablility and printing resistance.

2. Description of the Prior Art

Since plate materials made of aluminum or aluminum alloy, are light in weight, corrosion-resistant and easy to fabricate and also are well adapted for surface treatment, they have been used generally as substrates for lithographic printing plates.

As aluminum substrates for lithographic printing, plate materials made for example of AA1050 (at 99.5 wt % Al purity), AA1100 (at 99.0 wt % Al purity) and AA3003 (Al-0.05 to 0.2 wt % Cu-1.0 to 1.5 wt % Mn alloy) have often been used. These substrates are usually given a surface roughening treatment, for example, by means of a mechanical, chemical or electrochemical method for providing the surface with water retainability, then subjected to anodic oxidation and then coated with a light-sensitive composition, followed by drying to prepare a so-called PS plate. The PS plate is given the usual a plate-making treatment such as image exposure, development, rinse or lacquor coating and is then suitable for printing. The, the solubility to a liquid developer differs between the exposed area and the non-exposed area of the light-sensitive resin coated to the surface of the aluminum plate material, by which either one of the exposed area or the non-exposed area is removed, while the other of them remains to form an image on the aluminum plate as the substrate. The image area is ink receptive, while the hydrophilic surface of the aluminum substrate is uncovered in the non-image area from which the light-sensitive resin layer is dissolved and removed, to provide hydrophilicity. Then, the resultant printing plate is bent on both ends and clamped at the printing cylinder of a printing machine. Damping water is supplied to the surface of the printing plate and thereby maintains a film of damping water at the non-image area to repel oily ink therefrom and, on the other hand, the ink is attracted to an image area. Then printing is conducted by repeatedly transferring the ink deposited to the image area to a blanket and then transferring it to the surface of print paper.

For the aluminum plate material serve as the substrate for the lithographic printing have good mechanical strength for improving the press life and after a suitable roughening treatment be easily wettable with water with a sufficient water retention for preventing the deposition of the printing ink on the non-image area upon printing.

AA1000 series plate material generally used so far as the aluminum substrate for the lithographic printing plate has a satisfactory etching property and can easily provide a surface having good uniformity and excellent water retainability by the surface roughening treatment, for example, by means of an electrochemical method, but it suffers in the mechanical property of the plate material.

Recently, printing speed has increased with the advances in printing technique and stresses applied to a printing plate mechanically clamped at both ends to a printing cylinder of a printing machine are inevitably increased. Then, if the strength of the printing plate is insufficient, it has often led to the deformation or destruction in the clamped portions to bring about problems such as plate cracking, or the printing plate is disconnected to make printing impossible due to repeating stresses exerted on the bent portions of the printing plate. In view of the above, there is a need for an aluminum alloy substrate having higher mechanical strength for the lithographic printing plate.

With the aim as described above, attempts have been made to use AA3000 series of aluminum alloy having high mechanical strength (Al-Mn series alloy) as the material for the lithographic printing plate. For instance, Japanese Laid-Open Patent, Sho 60-230951 discloses a substrate for the printing plate using an aluminum alloy plate containing 0.05 to 1.0% by weight of Mn, not more than 0.20% by weight of Si and not more than 0.50% weight of Fe, and Japanese Laid-Open Patent, Hei 1-306288 discloses a substrate for the printing plate using an aluminum alloy plate containing 0.2 to 0.5% by weight of Si, 0.2 to 0.7% by weight of Fe, 0.3 to 1.5% by weight of Mn and not more than 0.05% by weight of Cu.

Although, the Al-Mn series aluminum alloy material is excellent as compared with AA1000 series alloy in mechanical strength, if it is used as the substrate for the lithographic printing plate, there has been a drawback in the homogenity or the hydrophilicity of the substrate surface obtianed by the surface roughening treatment, especially, by electrolytic etching or alkali etching, resulting in a non-etched portion, which makes it difficult to obtain a uniform hydrophilic surface and tends to cause ink stains in the non-image regions.

OBJECT AND SUMMARY OF THE INVENTION

The present inventors have made earnest studies with an aim of improving the hydrophilic property of the etched surface of the Al-Mn series alloy material described above without deteriorating the mechanical strength thereof and, as a result, have discovered that an aluminum substrate for a lithographic printing plate having good homogenity and excellent water retainability after electrolytic etching or alkali etching without loss in the inherent mechanical strength of an Al-Mn series alloy material can be obtained from an alloy comprising 0.2 to 0.5% by weight of Si, 0.3 to 0.7% by weight of Fe, 0.9 to 1.5% by weight of Mn, 0.05 to 0.3% by weight of Mg and the substantial balance of aluminum, and further incorporating 0.004 to 0.02% by weight of Cu and 0.01 to 0.04% by weight of Ti such that the Cu/Ti weight ratio is not more than 1, or the Si/Fe weight ratio is from 0.3 to 0.8.

The novelty of the present invention resides in the use for a lithographic printing plate of an aluminum alloy plate containing 0.2 to 0.5% by weight of Si, 0.3 to 0.7% by weight of Fe, 0.004 to 0.02% by weight of Cu, 0.9 to 1.5% by weight of Mn, 0.05 to 0.3% by weight of Mg and 0.01 to 0.04% by weight of Ti, with Cu/Ti weight ratio being less than 1 or Si/Fe weight ratio being from 0.3 to 0.8 and the balance of aluminum and impurities, in which the surface of the aluminum alloy plate is subjected to electrolytic surface roughening and anodic oxidation.

Since the substrate according to the present invention can maintain substantially the same mechanical strength as that of the substrate using the conventional AA3003 alloy plate material and can easily obtain an etched surface of good homogenity and excellent water retainability, by means of electrolytic etching or alkali etching, clear printed copies with less ink stain can be obtained easily.

The description will now refer more specifically to an aluminum alloy substrate according to the present invention.

Explanation will first be directed to the composition of the ingredients of the aluminum alloy substrate used for the lithographic printing according to the present invention. Si: 0.2–0.5 wt %

Si in an amount not less than 0.2% by weight as a lower limit value serves to prevent the formation of $Al_6(MnFe)$, forms $\alpha$-Al(MnFe)Si as a second phase compound and prevents ink stain. However, if Si is incorporated by more than the upper limit, it tends to form elemental Si, to worsen ink stain.

Fe: 0.3–0.7 wt %

Fe is necessary for the improvement in mechanical strength. If the content is less than the lower limit, the effect is insufficient, whereas if it exceeds the upper limit, a coarse Al-Fe series or Al-Mn-Fe series compound is crystallized to hinder the homegenity of the electrolytically roughened surface.

The Si/Fe weight ratio is an index for making the etching property appropriate and improving the homogenity of the electrolytically roughened surface by the alkali etching treatment applied as a pre-treatment or post-treatment to the electrolytically roughened surface. If the ratio exceeds 0.8, the etching property becomes insufficient, reducing the homogenity of the electrolytically roughened surface. The ratio is preferably from 0.3 to 0.8. If it is less than 0.3, the amount of alkali etching become excessive, causing ink stain and reducing the printing resistance.

Mn: 0.9–1.5 wt %

Mn is used for the improvement in mechanical strength. The effect is not sufficient if the content is lower than the lower limit, whereas an Al-Mn series or Al-Mn-Fe series compound is crystallized reducing the homogenity of the electrolytically roughened surface if it exceeds the upper limit.

Mg: 0.05 to 0.3 wt %

Addition of Mg tends to improve the mechanical strength of the plate material without deteriorating the etching property in the electrolytic surface roughening treatment. Addition of Mg by more than 0.3 wt % as the upper limit is not preferred since it reduces the ability of both ends of the printing plate to bend when the printing plate material is clamped to the printing cylinder of a printing machine, making accurate setting difficult.

On the other hand, if Mg is less than the lower limit, the strength improvement is insufficient.

Cu: 0.004 to 0.02 wt %

Addition of Cu can aid in giving uniforms electrolytic surface roughening ability to the surface of the print in cooperation with the presence of the Ti ingredient. The effect is insufficient with a Cu content of less than the lower limit, whereas non-etched portion tends to result in the electrolytic surface roughening to cause ink stain and reduce the printing resistance if it is added by more than the upper limit.

Ti: 0.01–0.04 wt %

Addition of Ti can similarly aid in giving uniform electrolytic surface roughening to the print surface in cooperation with the presense of the Cu ingredient. If the content is less than the lower limit, the effect is insufficient, the homogenity of the electrolytically roughened surface is reduced, and non-etched portions tend to be formed, causing ink stain and reducing the printing resistance. If it is added by more than the upper limit, the entire electrolytically roughened surface dissolves and lacks roughness and the water retainability is reduced, causing ink stain and also reduction in the printing resistance.

In the present invention, addition of Cu and Ti in the aluminum alloy plate material for lithographic printing has an aim of improving the homogenity and the hydrophilic property of the plate surface and preventing the formation of the non-etched portions thereon following the surface rougnening treatment, especially, electrolytic etching or alkali etching to the surface, without hindering the mechanical strength of the plate material obtained by the addition of other ingredients such as Si, Fe, Mn or Mg. For attaining this purpose, it has been experimentarily confirmed that the content of Cu and Ti should be set to from 0.004 to 0.02% by weight of Cu and from 0.01 to 0.04% by weight of Ti with the Cu/Ti weight ratio being not more than 1. It has been found that, by adjusting the Cu/Ti weight ratio within such a range, it is possible to stabilize the electrolytic surface roughening treatment and obtain a homogenous hydrophilic surface with reduced the ink stain on the printing surface and improved printing resistance.

Explanation will now be focused on the method of preparing the aluminum alloy material for lithographic printing according to the present invention.

Initially, a molten aluminum alloy as described above is prepared by an ordinary method, which is then cast into a slab. Casting is desirably made by a continuous water cooling casting method (DC casting). It is desirable to add boron by not more than 0.01% by weight for refining the grain structures upon casting the slab. The slab obtained by the casting is given a homogenizing treatment in accordance with a customary method of maintaining a temperature at 460° to 600° C. for more than two hours, then rolled into an appropriate plate thickness by means of a hot rolling and a cold rolling, then given an annealing treatment at a temperature of about 400° to 600° C., and then subjected to cold rolling fabrication at a ratio of not lower than 10% and, preferably, not lower than 20% to be finally fabricated into a plate-like product of about 0.1 to 0.5 mm thickness.

Further, a tempering treatment may be applied if required after the final cold rolling by maintaining a temperature from 100° to 350° C. for not more than 2 hours by using an annealing device. The temperature range for carrying out tempering after the final cold rolling is desirably from 100° to 250° C. when of using a batch type device, while desirably from 200° to 350° C. for a continuous annealing device.

In the aluminum alloy plate material thus prepared, $\alpha$-Al(MnFe)Si compound is finely dispersed and contained, to attain a roughened surface, which is uniform and of excellent water retainability by the subsequent surface roughening treatment.

Further, Mg and Si in the fabrication structure is uniformly dispersed in the matrix as a solid-solubilized state or a fine (Mg, Si) phase, by which the mechanical strength and fatigue strength (cracking-resistance) of the plate material can be ensured.

Description will now turn specifically to the method of carrying out the surface treatment to the printing plate of the substrate for lithographic printing.

The graining method used in the present invention is an electrolytic surface roughening or graining method which apples AC current in a hydrochloric acid or nitric acid type electrolyte. In the present invention, a mechanical surface roughening method such as a wire brush graining method of scratching the surface of aluminum with a metal wire, a ball graining method of graining the surface of aluminum with abrading balls and abrasives or a brush graining method of graining the surface with a nylon brush and abrasives may be used together with the electrolytic surface roughening method.

Prior to the electrolytic surface roughening treatment, any rolling oils deposited to the aluminum surface or abrasives adhering on the surface after mechanical surface roughening (in a case of applying mechanical surface roughening) are removed by surface treatment for cleaning-up the surface.

Generally, for removing the rolling oils, there is used a solvent such as trichlene or a surface active agent. Further, an aluminum alloy plate can be dipped at a temperature of 20° to 80° C. for 5 to 250 sec into an aqueous solution comprising 1 to 30% of sodium hydroxide, potassium hydroxide, sodium carbonate and/or sodium silicate and then into an aqueous 10–30% nitric acid or sulfuric acid solution at 20–70° C. for 5–250 sec, thereby to effect neutralization and removal of smut after alkali etching is used generally for the removal for both of the rolling oils and the abrasives.

After the surface cleaning for the aluminum alloy plate, it is is given electrolytic surface roughening.

The electrolytic solution used in the electrolytic surface roughening treatment in the present invention is preferably has a concentration within a range from 0.01 to 3% by weight, more preferably, from 0.05 to 2.5% by weight in the case of a hydrochloric acid solution. Further, the concentration in the case of using a nitric acid solution is suitably from 0.2 to 5% by weight, more preferably, from 0.5 to 3% by weight.

Further, a corrosion suppressing agent (or stabilizing agent) such as nitrates, chlorides, monoamines, diamines, aldehydes, phosphoric acid, chromic acid, boric acid, oxalic acid and ammonium salt, or grain unifying agent can be added, if necessary, to the electrolytic solution. The electrolytic solution may contain an appropriate amount. (1–10 g/l) of aluminum ions.

The treatment is usually carried out at a temperature of electrolytic solution from 10° to 60° C. The AC current usable in this case may be any of rectangular, trapezoidal or sinusoidal waveform providing that positive and negative polarities are applied alternately. Usual commercial AC current of single phase or three phase may be used. The current density applied for the treatment is desirably from 5 to 100 A/dm$^2$ for 10 to 300 sec.

The surface roughness of the aluminum alloy substrate in the present invention is controlled by the electrical quantity to a depth of 0.2 to 0.8 μm. If it exceeds 0.8 μm, the roughened surface is covered with macro pits extremely as compared with the case of using JIS A1050, which undesirably causes staining during printing. If the rougheness is less than 0.2 μm, damping water on the printing plate can not be controlled and mesh points in a shadow portion are liable to be entangled and printing is unsatisfactory.

The thus grained aluminum alloy is freed of smut deposited on the surface by means of 10–50% hot sulfuric acid (at 40°–60° C.) or diluted alkali (sodium hydroxide, etc.). If alkali removing is applied, the plate is successively dipped into an acid (nitric acid or sulfuric acid) for cleaning and neutralization.

After removing the smut on the surface, anodized layers are formed. Well known method can be used for the anodization and sulfuric acid as the most useful electrolytic solution. Next to the sulfuric acid, phosphoric acid is also a useful electrolytic solution. Furthermore, a method of using a mixed acid of sulfuric acid and phosphoric acid as disclosed in Japanese Laid-Open Patent Sho 55-28400 is also useful.

For the sulfuric acid method, the treatment is usually conducted by a DC current but AC current may also be used. The concentration of sulfuric acid used is from 5 to 30% and the electrolytic treatment is applied in a temperature range from 20° to 60° C. for 5 to 250 sec to form 1 to 10 g/m$^2$ of oxide layers on the surface. In the electrolytic solution, aluminum ions are preferably present. Further, the current density is preferably from 1 to 20 A/dm$^2$. In the case of the phosphoric acid method, treatment is applied at a concentration of 5 to 50%, a temperature of 30° to 60° C., for 10 to 300 sec and at a current density of 1 to 15 A/dm$^2$.

After forming the oxide layers in this way, a post treatment may be applied if necessary. For instance, there may be used a dipping treatment in an aqueous solution of polyvinyl phosphoric acid as described, for example, in British Patent No. 1,230,447 or in an aqueous solution of an alkali metal silicate as disclosed in U.S. Pat. No. 3,181,461. Further, if necessary, it is also possible to apply a primer layer of a hydrophilic polymer, which can be selected depending on the property of the light-sensitive material applied subsequently.

The light-sensitive layers exemplified below can be applied to the surface of a substrates produced by the production process according to the present invention to prepare PS plates.

(I) Light-sensitive Layer Comprising an o-Napphthoquinonediazidosulfonate of a Polyhydric Polymeric Compound and a Mixed Phenol-Cresol Novolak Resin As the polyhydric polymeric compounds, there may be used those having an average molecular weight ranging from 1,000 to 7,000 and examples thereof include polycondensed products of phenol compounds having at least two hydroxyl groups on the benzene ring such as resorcinol and pyrogallol; and aldehyde compounds such as formalin and benzaldehyde. In addition, there may further be mentioned, for instance, phenol-formaldehyde resins, cresol-foraldehyde resins, p-tert-butylphenol-formaldehyde resins and phenol-modified xylene resins. Examples of more preferred novolak resins include phenol-m-cresol-formaldehyde novolak resins as disclosed in Japanese Laid-Open Patent, Sho 55-57841 which are novolak resins containing phenol moiety having a relatively high molecular weight. In addition, to form visible images through exposure to light, the light-sensitive layer may be incorporated with a compound which generates a Lewis acid by the action of light, such as o-naphthoquinonediazido-4-sulfonyl chloride, an inorganic anionic salt or o-diazodiphenylamine, a trihalomethyl oxadiazole compound and a trihalomethyl oxadiazole compound having a benzofuran ring. On the other hand, triphenylmethane dyes such as Victoria Pure Blue BOH, Crystal Violet and Oil Blue are Used as the dye. The light-sensitive composition comprising the components explained above is applied in an amount ranging from 0.5 to 3.0 g/$m^2$ as the solid content.

(II) Light-sensitive Layer Composed of Diazo Resins and Water-insoluble and Lipophilic Polymeric Compounds Having Hydroxyl Groups The aluminum alloy plate is dipped in an alkali metal silicate bath as disclosed in U.S. Pat. No. 3,181,461 after forming an anodized layer as explained above. It is preferred to apply, to the surface thus treated, a light-sensitive layer containing a $PF_6$ salt or a $BF_4$ salt of a diazo resin, an organic salt of a diazo resin and a water-insoluble and lipophilic polymeric compound. If such a light-sensitive layer is formed on the surface of the substrate according to the present invention, there can be obtained a PS plate excellent in storage stability, which provides good visible images after development and is stable even under severe conditions such as high temperature and high humidity conditions.

The diazo resins used for the above are $PF_6$ salts or $BF_4$ salts and organic salts thereof and examples thereof include, for example, such aromatic sulfonic acid as triisopropyl naphthalene-sufonic acid, 4,4'-biphenyldisulfonic acid, 5-sulfosalicylic acid, 2,5-dimethylbenzene sulfonic acid, 2-nitrobenzene sulfonic acid, 1-naphthol-5-sulfonic acid, p-toluene sulfonic acid and such hydroxy group-containing aromatic sulfonic acids as 2-hydroxy-4-methoxybenzophenone-5-sulfonic acid.

The polymeric compounds having hydroxyl groups are those having weight-average molecular weight ranging from 5,000 to 500,000 and examples thereof include:

(1) copolymers, for example, of N-(4-hydroxyphenyl)acrylamide, N-(4-hydroxphenyl)methacrylamide or N-(4-hydroxynaphthyl)methacrylamide with other monomers and
(2) copolymers, for instance, of o-, m- or p-hydroxystyrene and other monomers, and
(3) copolymers, for instance, of o-, m- or p-hydroxyphenyl methacrylate and other monomers.

Examples of the foregoing monomers include:

(i) α, β-unsaturated carboxylic acids such as acrylic acid, methacrylic acid and maleic anhydride;
(ii) alkyl acrylates such as methyl acrylate and ethyl acrylate;
(iii) alkyl methacrylates such as methyl methacrylate and ethyl methacrylate;
(iv) acrylamides or methacrylamides such as acrylamide and methacrylamide;
(v) vinyl ethers such as ethyl vinyl ether and hydroxyethyl vinyl ether;
(vi) styrens such as styrene and α-methylstyrene;
(vii) vinyl ketones such as methyl vinyl ketone;
(viii) olefins such as ethylene, propylene and isoprene; and
(ix) N-vinyl pyrrolidone, N-vinyl carbazole, acrylonitrile and methacrylonitrile. In addition other monomers capable of copolymerizable with the monomers having aromatic hydroxyl groups may also be used.

(4) Further, oil soluble dyes such as Victoria Pure Blue, BOH, Crystal Violet, Victoria Blue, Methyl Violet and Oil Blue #603 are preferably added to the light sensitive layer. To obtain light-sensitive layers having the composition discussed above, fluorine-atom containing surfactants, anionic surfactants, plasticizers (e.g., dibutyl phthalate, polyethylene glycol, diethyl phthalate and trioctyl phosphate), known stabilizers (e.g., phosphoric acid, phosphorous acid and organic acids) and the like are added and the layer is disposed so that the coated amount thereof weighted after drying ranges from 0.5 to 2.5 g/$m^2$.

(III) Light-Sensitive Layer Composed of a Photopolymerizable Light-sensitive Composition Which Comprises a Polymer Having Carboxylic Acid Residues or Carboxylic Anhydride Residues, an Addition Polymerizable Unsaturated Compound and a Photopolymerizable Initiator In the case of the photopolymerizable light-sensitive materials, it is preferred that the surface of a substrate which has been grained in a hydrochloric acid bath be anodized with phosphoric acid or a mixture of phosphoric acid and sulfonic acid.

After anodizing the substrate in a phosphoric acid bath and then treating with a silicate, the surface of the substrate is coated with a layer of a photopolymerizable light sensitive composition which comprising a polymer having carboxylic acid residues or carboxylic anhydride residues, an addition polymerizable unsaturated compound and a photopolymerizable initiator. Moreover, the substrate of the present invention may be used for preparing a PS plate to which an electrophotographic light-sensitive material is applied, as disclosed in Japanese Laid-Open Patent, Sho 80-107042.

The lithographic printing plates thus prepared show good storeability, the exposed surface of the aluminum plate at non-image areas is not stained with a printing ink and has good hydrophilicity favorable for rapidly repelling printing ink and the surface has high adhesion to the light-sensitive layer.

Preferred examples of the polymers having carboxylic acid sidues or carboxylic anhydride residues favorable for this purpose are those polymers having structural units selected from the group consisting of those represented by the following formula (A) to (D):

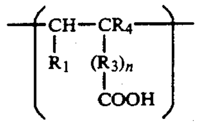
(A)

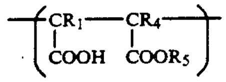
(B)

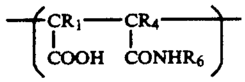
(C)

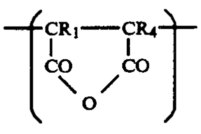
(D)

wherein $R_1$ and $R_4$ each represents a hydrogen atom or an alkyl group, $R_3$ represents a phenylen group or an alkylene group optionally having a hydroxyl group; $R_5$ represents a hydrogen atom or an alkyl group optionally having substituents; $R_6$ represents a hydrogen atom or an alkyl group, an allyl, aryl or cycloalkyl group which may have substituents, and n is an integer of 0 or 1.

More specifically, examples of the structural units represented by the formula (A) are acrylic acid, methacrylic acid, crotonic acid and vinyl benzoic acid; examples of the structural units represented by the formula (B) are maleic acid, maleic acid monohydroxyalkyl ester and maleic acid monocyclohexyl ester; examples of the structural units of the formula (C) are maleic acid mohoalkylamide and maleic acid monohydroxyalkylamide; and examples of the structural units represented by the formula (D) are maleic anhydrid and itaconic anhydride. As the polymers, those having an average molecular weight ranging from 1,000 to 100,000 are usually used.

The addition polymerizable unsaturated compounds are monomers having ethylenically unsaturated double bonds which can cause addition polymerization between them in the three dimensional direction when the polymerizable light-sensitive composition is irradiated with actinic rays. Examples thereof are unsaurated carboxylic acids, esters of unsaturated carboxylic acids and aliphatic polyhydroxyl compound and esters of unsaturated carboxylic acid and aromatic polyhydroric compounds.

As the photopolymerization initiators, there may be used, for instance, benzoin, benzoin alkyl ether, benzophenone, anthraquinone and Michler's ketones alone or in combination in an amount ranging from 1 to 3 $g/m^2$ weighted after drying.

EXAMPLE

Examples of the present invention will be shown.

EXAMPLE

Aluminum alloys A-P of 16 types as shown in Table 1 were melted, filtered by using fine porous filters and then cast by DC casting into slabs each of 560 mm thickness. After maintaining each of the slabs at 560° C. for 4 hours to apply a homogenizing treatment, it was hot rolled to 6 mm thickness and, further, cold rolled into a plate material of 1.6 mm thickness. Then, after elevating the temperature at a rate of 150° C./sec by transverse flux induction heating and maintaining at 450° C. for 5 sec, it was cooled with water and then given a final cold rolling to a thickness of 0.3 mm to prepare an aluminum alloy substrate for a lithographic printing plate.

Then, after removing rolling oils deposited to the surface with 10% sodium hydroxide, it was cleaned under neutralization in 20% nitric acid solution at a temperature of 20° C., and then applied with AC current electrolysis in a 1% hydrochloric acid electrolytic solution or 1% nitric acid electrolytic solution, with a current density of 30 $A/dm^2$, at 50° C. for 10 sec.

Successively, it was dipped in an aqueous 15% solution of sulfuric acid at 50° C. for 3 min to clean the surface and then processed in an electrolytic solution mainly comprising 20% sulfuric acid at a bath temperature of 30° C., to form 3 $g/dm^2$ of oxide layers.

A light-sensitive layer of the following composition was formed on the thus prepared sample to a coating amount of 2.5 $g/m^2$ after drying.

| | |
|---|---|
| Ester compound of naphtoquinone(1,2)diazide-(2)-5-sulfonic acid chloride and resorcine-benzaldehyde resin | 1 part by weight |
| Copolycondensed resin of phenol, m-, p-mixed cresol and formaldehyde | 3.5 parts by weight |
| 2-trichloromethyl-5-(β-(2'-benzofuryl vinyl)-1,3,4-oxadiazole | 0.03 parts by weight |
| Victoria Pure Blue BOH (manufactured by Hodogaya Chemical) | 0.1 parts by weight |
| o-Naphtoquinonediazide sulfonic acid ester of p-butylphenylbenz aldehyde novolak resin | 0.05 parts by weight |
| Methylcellosolve | 27 parts by weight |

The sample was exposed by using a 3 KW metal halide lamp at a 1 m distance for 50 sec and then developed with an aqueous 4% solution of sodium metasilicate at 25° C. for 45 sec, to obtain a lithographic printing plate.

Tests were conducted for the thus prepared samples A-P regarding mechanical strength, homogenity or uniformity of the electrolitically roughened surface, resistance to ink stain and case of fitting to printing plate cylinder.

The results are shown in Table 1.

TEST METHOD (1) Uniformity of electrolitically roughened surface

Uniformity of pits were evaluated by the observation for the surface state with a scanning type electrone microscope and the results were expressed for the formed micropits as: "o" for uniform micropits, "Δ" for somewhat not uniform micropits and "x" for not uniform macropits.

(2) Resistance to ink staining

The printing plates were set on an offset printer KOR and the degree of stain in the non-image area was functionally evaluated.

(3) Ease of fitting to the printing cylinder

The printing plate was bent by a bender and set to Komori Offset rotary press system 18 LR418, for which ease of fitting to the printing cylinder was evaluated.

(4) Alkali etching property

The surface after the electrolytic roughening was processed by dissolving with an aqueous 10% NaOH solution and the change of the pits form was functionally evaluated.

TABLE 1

| | Alloy composition (wt %) | | | | | | | | Tensile strength | Uniformity in electro-lytically roughened | Resistance to ink | Fitness to printing | Alkali etching | Overall |
|---|---|---|---|---|---|---|---|---|---|---|---|---|---|---|
| | Si | Fe | Si/Fe | Cu | Mn | Mg | Ti | Cu/Ti | ($kg/mm^2$) | surface | stain | cylinder | property | judgement |
| Material of the Invention | | | | | | | | | | | | | | |
| A | 0.32 | 0.54 | 0.59 | 0.010 | 1.23 | 0.24 | 0.015 | 0.67 | 25.1 | ○ | ○ | ○ | ○ | ○ |
| B | 0.45 | 0.64 | 0.70 | 0.006 | 1.01 | 0.28 | 0.025 | 0.25 | 25.3 | ○ | ○ | ○ | ○ | ○ |
| C | 0.26 | 0.55 | 0.49 | 0.010 | 1.12 | 0.22 | 0.025 | 0.40 | 25.1 | ○ | ○ | ○ | ○ | ○ |
| D | 0.21 | 0.62 | 0.34 | 0.017 | 1.09 | 0.24 | 0.025 | 0.68 | 24.8 | ○ | ○ | ○ | ○ | ○ |
| E | 0.28 | 0.49 | 0.57 | 0.010 | 1.13 | 0.23 | 0.020 | 0.50 | 24.4 | ○ | ○ | ○ | ○ | ○ |
| F | 0.39 | 0.62 | 0.63 | 0.006 | 1.38 | 0.27 | 0.035 | 0.17 | 25.4 | ○ | ○ | ○ | ○ | ○ |
| G | 0.42 | 0.56 | 0.75 | 0.010 | 1.01 | 0.19 | 0.020 | 0.50 | 24.0 | ○ | ○ | ○ | ○ | ○ |
| H | 0.24 | 0.37 | 0.65 | 0.010 | 1.25 | 0.26 | 0.020 | 0.50 | 24.6 | ○ | ○ | ○ | ○ | ○ |

TABLE 1-continued

| | Alloy composition (wt %) | | | | | | | | Tensile strength ($kg/mm^2$) | Uniformity in electro-lytically roughened surface | Resistance to ink stain | Fitness to printing cylinder | Alkali etching property | Overall judgement |
|---|---|---|---|---|---|---|---|---|---|---|---|---|---|---|
| | Si | Fe | Si/Fe | Cu | Mn | Mg | Ti | Cu/Ti | | | | | | |
| Comparative material | | | | | | | | | | | | | | |
| I | 0.32 | 0.54 | 0.59 | 0.025 | 0.82 | 0.22 | 0.032 | 0.78 | 23.8 | X | Δ | O | O | X |
| J | 0.14 | 0.54 | 0.26 | 0.010 | 1.21 | 0.19 | 0.025 | 0.40 | 24.1 | O | X | O | X | X |
| K | 0.37 | 0.52 | 0.71 | 0.010 | 1.74 | 0.23 | 0.020 | 0.50 | 25.6 | X | Δ | O | O | X |
| L | 0.52 | 0.68 | 0.77 | 0.010 | 1.25 | 0.20 | 0.020 | 0.50 | 24.2 | O | X | O | O | X |
| M | 0.34 | 0.76 | 0.45 | 0.010 | 1.21 | 0.15 | 0.020 | 0.50 | 23.9 | X | Δ | O | O | X |
| N | 0.35 | 0.35 | 1.0 | 0.017 | 1.29 | 0.20 | 0.030 | 0.57 | 24.2 | Δ | O | O | X | X |
| O | 0.32 | 0.57 | 0.56 | 0.010 | 1.24 | 0.39 | 0.010 | 1.00 | 27.0 | Δ | Δ | X | O | X |
| P | 0.31 | 0.56 | 0.55 | 0.014 | 1.23 | 0.26 | 0.010 | 1.4 | 25.2 | O | X | O | O | X |

As apparent from the results shown in Table 1, it can be seen that the alloys A-H as the materials according to the present invention are excellent with respect to the uniformity of the electrolytically roughened surface, resistance to ink stain and ease of fitting to the printing cylinder, whereas alloys I-P out of the composition range or the composition ratio in the present invention are inferior in one of the uniformity of the electrolytically roughened surface, resistance to the ink stain or ease of fitting to the printing cylinder and are disadvantageous from an overall point of view.

The printing plate using for the substrate for the lithographic printing plate an alloy composition according to the present invention can provide excellent results in that fine printed copies with less stain in the non-image areas can be rapidly printed in large number, since it has higher mechanical strength, greater resistance to ink stain because of excellent surface roughening property from electrolytic etching and alkali etching and uniform hydrophilic surface, and since its fit to the printing cylinder of the printer is satisfactory.

What is claimed is:

1. An aluminum alloy substrate for a lithographic printing plate consisting essentially of an aluminum alloy plate containing 0.2 to 0.5% by weight of Si, 0.3 to 0.7% by weight of Fe, 0.004 to 0.02% by weight of Cu, 0.9 to 1.5% by weight of Mn, 0.05 to 0.3% by weight of Mg and 0.01 to 0.04% by weight of Ti and the balance of Al and impurities, in which the surface of said aluminum alloy plate is given a an electrolytic surface roughening treatment and an anodizing treatment.

2. An aluminum alloy substrate for a lithographic printing plate as defined in claim 1, wherein the Cu/Ti weight ratio is not more than 1.

3. An aluminum alloy substrate for a lithographic printing plate as defined in claim 1, wherein Si/Fe weight ratio is within the range of 0.3 to 0.8.

* * * * *